Oct. 6, 1959 — A. ROTH — 2,907,258
VACUUM COMMUNICATING DEVICE FOR ROTARY NEGATIVE HOLDER
Filed March 10, 1955
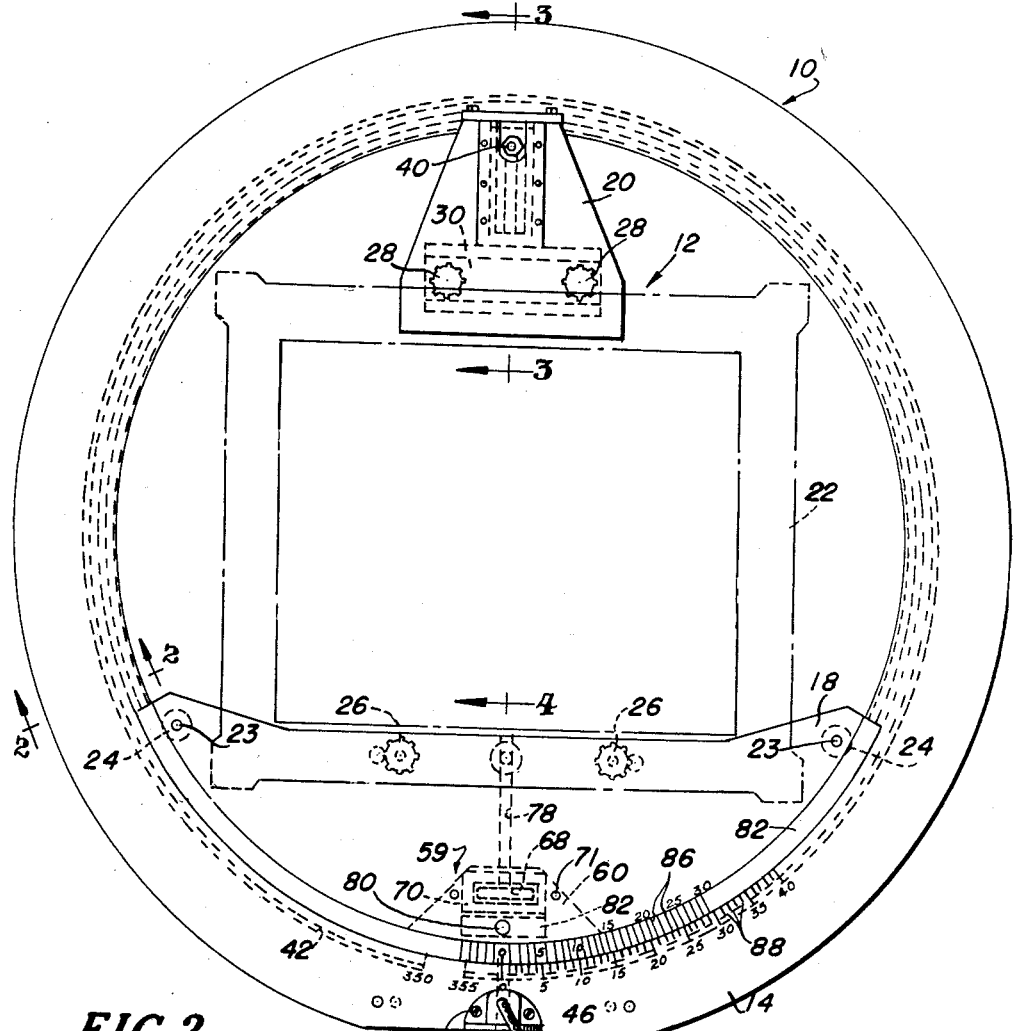
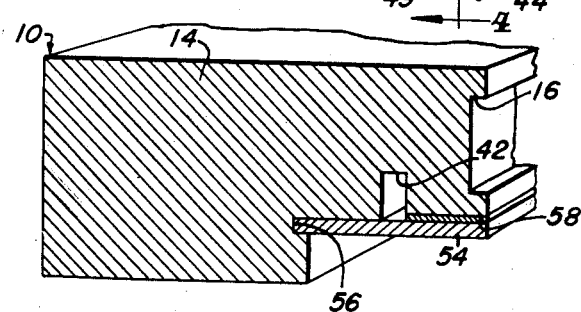
INVENTOR
ARTUR ROTH Oct. 6, 1959 A. ROTH 2,907,258
VACUUM COMMUNICATING DEVICE FOR ROTARY NEGATIVE HOLDER
Filed March 10, 1955 2 Sheets-Sheet 2
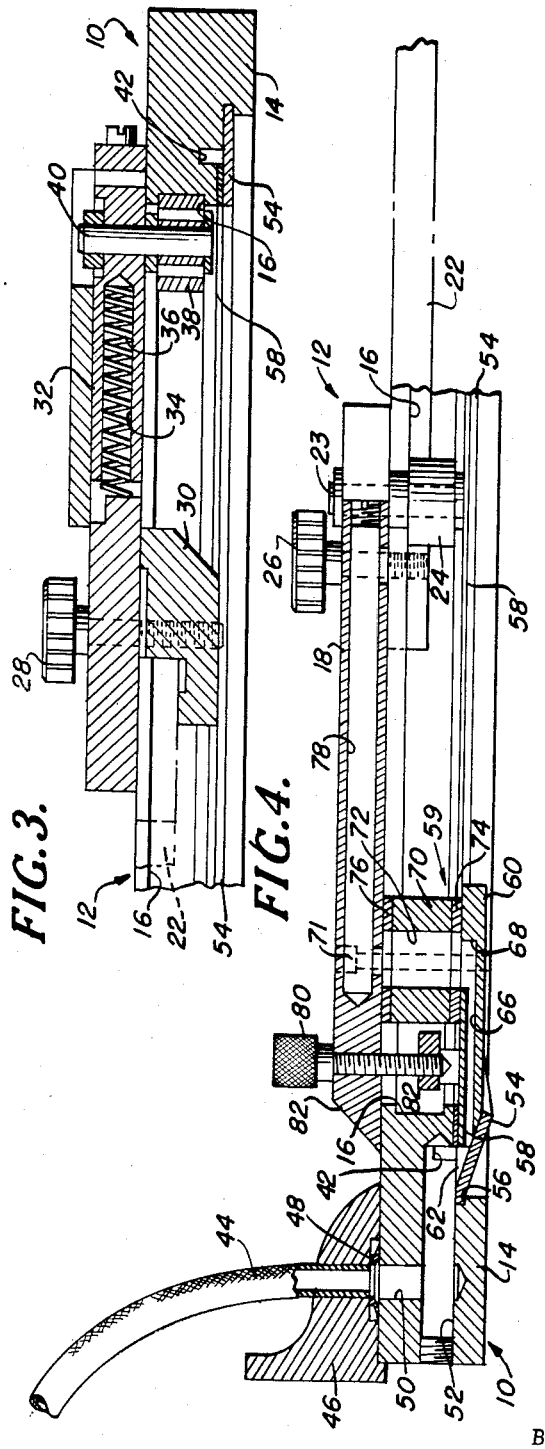
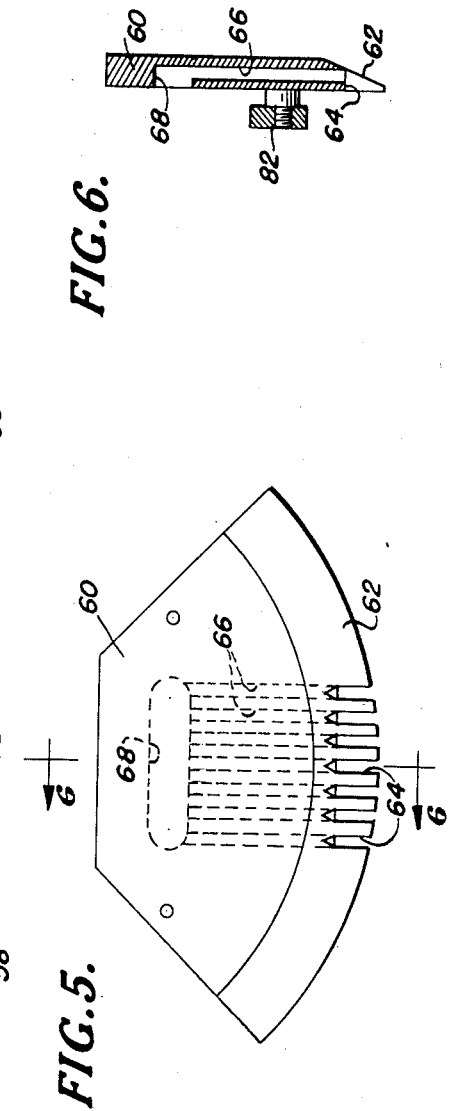
INVENTOR
ARTUR ROTH

United States Patent Office 2,907,258
Patented Oct. 6, 1959

2,907,258

VACUUM COMMUNICATING DEVICE FOR ROTARY NEGATIVE HOLDER

Artur Roth, Philadelphia, Pa., assignor to Lanston Monotype Machine Company, Philadelphia, Pa., a corporation of Virginia Application March 10, 1955, Serial No. 493,360

7 Claims. (Cl. 95—76)

This invention relates to improvements in vacuum holders and more particularly to vacuum holders arranged to be moved into any position of rotational adjustment.

The present invention is adapted to be utilized with negative holders of the type disclosed in Patent No. 2,237,704, issued April 8, 1941, to William C. Huebner. Such a vacuum holder is adapted to hold either negatives or positives and for conciseness, the term "negative" and derivatives thereof are used in the title of this invention and throughout the description and claims as comprehending both negatives and positives.

A vacuum negative holder of the type noted above is generally incorporated in a photographic printing or composing apparatus such as is used for repeating prints from the same transparent printing plate or negative in different arrangement, for composing a number of different subjects in predetermined arrangement on a press plate, or for producing a plurality of press plates of a given subject to be used in multi-color presses for printing different colors. One embodiment of such an apparatus is disclosed in Patent No. 1,809,274, issued June 9, 1931, to William C. Huebner.

It will be apparent that in the operation of the composing apparatus for certain of the purposes noted above, a rotation of the vacuum negative holder about its own axis is necessary. In the known apparatus of this type, rotation of the vacuum negative holder necessitates many bothersome and time consuming manipulations in order to connect the holder with a source of suction or vacuum pressure in every position of rotational adjustment thereof. In the operation of the apparatus, only one of the plurality of connections is utilized in a given range of rotational adjustment. Thus, it becomes necessary when the holder is rotationally adjusted to remove the hose from one connection, plug up the connection and then to open the next connection and attach the hose thereto to commence operation.

Accordingly, it is an object of the present invention to provide improved means for communicating a suction or vacuum source to a rotary vacuum negative holder which requires no manipulation during the operation of the holder in any position of rotational adjustment.

A further object of the present invention is the provision of a vacuum communicating device for a vacuum negative holder having improved means for communicating a suction or vacuum source from a fixed position continuously to the holder in any position of rotational adjustment thereof.

A still further object of the present invention is the provision of an improved means for continuously communicating a vacuum source to a rotary vacuum negative holder which is simple in construction, easy in operation and economical to produce and maintain.

These and other objects of the present invention will become more apparent during the course of the following detailed description and appended claims.

The invention may best be understood with reference to the accompanying drawings wherein an illustrative embodiment is shown.

In the drawings:

Figure 1 is a front elevational view of a portion of a photographic composing apparatus incorporating the present invention;

Figure 2 is a fragmentary, perspective, cross-sectional view taken along the line 2—2 of Figure 1;

Figure 3 is a cross-sectional view taken along the line 3—3 of Figure 1;

Figure 4 is a cross-sectional view taken along the line 4—4 of Figure 1;

Figure 5 is a rear elevational view of the vacuum-communicating member of the present invention; and Figure 6, is a cross-sectional view taken along the line 6—6 of Figure 5.

Referring now more particularly to the drawings, there is shown in Figure 1 a vertically disposed annular frame assembly 10 arranged to be mounted in a photographic composing machine for vertical and horizontal movement in a manner well known in the art. The frame assembly 10 carries a vacuum negative holder assembly 12 for movement into any rotational position of adjustment.

The frame assembly 10 includes an annular frame member 14 of substantial ring-shape having an annular guide channel or bearing surface 16 formed in the interior surface thereof within which the rotary negative holder assembly 12 is adapted to be mounted.

The negative holder assembly 12 includes a quadrant or saddle member 18 operatively connected with the channel 16 at one side thereof for guided rotational movement therein and a cooperating saddle member 20 operatively connected with the channel 16 at the opposite side thereof for guided rotational movement. Detachably mounted between the cooperating members 18 and 20 is a vacuum negative holder 22 of the type disclosed in the aforesaid Huebner Patent No. 2,237,704.

The outer edge of saddle member 18 has journaled thereon, as by shafts 23, a pair of spaced rollers 24 extending from the rear surface thereof which are positioned adjacent the guide channel 16 for rolling contact therein. The inner portion of saddle member 18 is detachably connected with one end of the negative holder 22 by means of a pair of thumbscrews 26 extending through the saddle member and threadedly engageable into the adjacent portion of the negative holder. The inner end of cooperating saddle member 20 is provided with a similar pair of thumbscrews 28 threadedly engageable within a plate 30 disposed in engagement with the opposite end of the negative holder so as to clamp the latter between the saddle member 20 and plate 30. Slidably mounted in the member 20 is a roller carrying element 32 having a longitudinally extending bore 34 in its inner end. A spring 36 is disposed in the bore 34 and has its outwardly extending end in engagement with the adjacent portion of the member 20 so as to resiliently urge the roller carrying element radially outwardly. A roller 38 is suitably journaled on the outer end of element 32, as by shaft 40, and is arranged to be resiliently urged into the guide channel 16 for rolling contact therein.

From the above, it can be seen that the negative holder assembly 12 is mounted in the guide channel for movement into any position of rotational adjustment. The entire assembly 12 may be readily removed from the frame assembly 10 by merely sliding the element 32 radially inwardly against the action of spring 36 until roller 38 is disengaged from the guide channel 16. Moreover, the negative holder 22 may be easily removed from the saddle members 18 and 20 by merely loosening thumbscrews 26 and 28.

As briefly noted above, the physical requirements of a photographic composing apparatus do not permit the direct connection of a suction hose to the rotary negative holder itself, since such a hose would interfere with the working parts of the apparatus as the negative holder is moved into different positions of rotational adjustment. In accordance with the present invention, means are provided wherein the suction or vacuum source may be communicated with a fixed point on the frame assembly and then communicated to the negative holder in such a manner as to be continuously in communication therewith in any position of rotational adjustment. To this end, the frame member 14 is provided with an annular groove 42 extending inwardly from the rear surface thereof. A suitable source of suction or vacuum pressure (not shown) is communicated with the annular groove 42 by means of a flexible hose 44 having a saddle connection 46 on one end thereof. The saddle connection 46 includes a round rubber washer 48 having a feather edge held in sealing engagement with a portion of the frame member 14 by any suitable means, such as screws 49. The portion of the frame member 14 in engagement with the washer, is provided with a bore 50 which in turn communicates with one end of a second bore 52, the other end of which communicates with the annular groove 42.

The annular groove 42 is closed by means of an annular sealing member 54 of rubber or other suitable sealing material. The sealing member 54 has its outer peripheral edge secured in an annular recess 56 formed in the frame member 14 so that its forward surface will engage the rearward surfaces of the frame member disposed on opposite sides of the annular groove 42. As more clearly shown in Figure 2, the inner surface of the frame member 14 adjacent the groove 42 is preferably provided with a cooperating annular sealing member 58 of rubber or other suitable material. The cooperating sealing member 58 is preferably cemented or otherwise fixed to the inner rearward surface adjacent the groove 42.

Mounted on the saddle member 18 in the outer rearward surface thereof is a vacuum-communicating device 59 including vacuum-communicating member 60 arranged to enter between the cooperating sealing members 54 and 58 so as to communicate with the annular groove 42. The vacuum-communicating member 60 is provided with a transversely curved forward end 62 which is tapered to enable the end to easily enter between the cooperating sealing members. The central portion of the curved end 62 is provided with a plurality of parallel notches 64 having parallel apertures 66 extending therefrom. The apertures 66 communicate with a recess 68 formed in the forward surface of the vacuum-communicating member. A spacer and sealing element 70 is mounted, as by bolts 71, between the snorkel member 60 and the saddle member 18 and is provided with a through bore 72, the rearward end of which communicates with the recess 68. Sealing engagement between the bore 72 and recess 68 is maintained by a gasket 74. A second gasket 76 is disposed between the element 70 and the saddle member 18 so as to sealingly communicate the through bore 72 with one end of a radially extending bore 78 formed in the saddle member 18. The other end of the bore 78 is adapted to be fixedly communicated with the suction connection of the negative holder 22 in the usual manner.

It can thus be seen that a source of suction or vacuum pressure is communicated to the negative holder through the hose 44; bores 50 and 52 and annular groove 42 of frame member 14; notches 64, apertures 66 and recess 68 of the vacuum-communicating member; and bores 72 and 78 of the saddle member.

It will also be apparent that this communication will be effective in any position of rotational adjustment of the negative holder assembly since, the sealing member 54 will provide an effective seal of the annular groove 42 throughout its entire extent including that portion within which the vacuum-communicating member 60 is positioned. In other words, rotation of the negative holder assembly 12 will cause the vacuum-communicating member 60 to move between the cooperating sealing members 54 and 56. During this movement, the cooperating portions of the sealing members which are separated by the entrance of the vacuum-communicating member will maintain a seal therewith, while the portions of sealing members moving together as the vacuum-communicating member passes will be effectively held in sealing engagement.

The negative holder assembly is maintained in any position of rotational adjustment by tightening a threaded bolt 80 carried by the saddle member 18 and threadedly engaged within a spaced bar 82 carried by the vacuum-communicating member. In order to determine the position of annular adjustment of the negative holder assembly, the peripheral edge of the saddle member 18, may be tapered as at 84 and provided with a vernier scale 86, adapted to cooperate with a scale 88 extending around the adjacent portion of the frame member 14.

It is to be understood that the form of the invention herewith shown and described is to be taken as the preferred embodiment of the same and that various changes may be made without departing from the spirit of the invention or the scope of the appended claims.

I claim:

1. In a photographic printing apparatus, a supporting frame assembly, a negative holder assembly rotatably carried by said frame assembly, an annular groove formed in one of said assemblies, annular sealing means enclosing said groove, a vacuum-communicating device carried by the other of said assemblies and having a portion communicating with said groove, said sealing means providing a seal for the portion of said vacuum-communicating device in communication with said groove in any position of rotational adjustment of said negative holder assembly, and means for communicating a vacuum source to said negative holder assembly through said groove and said vacuum-communicating device.

2. Apparatus as defined in claim 1 wherein said vacuum-communicating device comprises a vacuum-communicating member having a tapered forward edge constituting the portion of said vacuum-communicating device which communicates with said groove.

3. Apparatus as defined in claim 2 wherein said forward edge is transversely curved and is provided with a notch through which said vacuum source is communicated.

4. In a photographic printing apparatus, a supporting frame assembly including an annular bearing surface, a negative holder assembly rotatably mounted in said annular bearing surface, said negative holder assembly including a segmental saddle member having a pair of peripherally spaced rollers on the outer portion thereof engaging said annular bearing surface and means on the inner portion thereof for connecting one portion of a negative holder therewith, a separate member having a spring-pressed roller on the portion thereof engaging said annular bearing surface and means on the inner portion thereof for connecting a spaced portion of the negative holder therewith, and means for communicating a vacuum source to the negative holder.

5. Apparatus as defined in claim 4 wherein the peripheral edge of said saddle member and said supporting frame assembly are provided with a vernier scale for indicating the position of rotational adjustment of said negative holder assembly.

6. Apparatus as defined in claim 4 wherein said means for communicating a vacuum source to the negative holder includes interengaging means between said saddle member and said frame assembly for communicating said vacuum source with the negative holder in any position of rotational adjustment thereof.

7. Apparatus as defined in claim 4 wherein said means for communicating a vacuum source to the negative holder comprises, an annular groove formed in said frame assembly, means on said frame assembly for communicating said groove with the vacuum source, annular sealing means enclosing said groove, a vacuum-communicating device carried by said saddle member, said vacuum-communicating device having a portion communicating with said groove, said sealing means providing a seal for the portion of said vacuum-communicating device in communication with said groove in any position of rotational adjustment of said negative holder assembly.

References Cited in the file of this patent

UNITED STATES PATENTS

| | | |
|---|---|---|
| 601,883 | Schwarz | Apr. 5, 1898 |
| 1,809,274 | Huebner | June 9, 1931 |
| 2,408,310 | Hassler | Sept. 24, 1946 |